United States Patent [19]
Whelan

[11] Patent Number: 5,178,921
[45] Date of Patent: Jan. 12, 1993

[54] BURNER BLOCK ASSEMBLY AND MATERIAL

[75] Inventor: Peter G. Whelan, Griffith, Ind.

[73] Assignee: Inland Steel Company, Chicago, Ill.

[21] Appl. No.: 753,958

[22] Filed: Sep. 3, 1991

[51] Int. Cl.$^5$ .............................. B32B 5/16; F23L 5/00
[52] U.S. Cl. ................................... 428/34.5; 428/241; 428/920; 110/182.5
[58] Field of Search ...................... 428/241, 245, 34.5; 110/182.5

[56] References Cited

U.S. PATENT DOCUMENTS

| | | | |
|---|---|---|---|
| 4,202,148 | 3/1980 | Frahme et al. | 52/592 |
| 4,313,789 | 2/1982 | Frahme | 162/152 |
| 4,389,189 | 6/1983 | Harvey et al. | 432/247 |
| 4,759,297 | 7/1988 | McNally et al. | 110/182.5 |

Primary Examiner—George F. Lesmes
Assistant Examiner—Chris Raimund
Attorney, Agent, or Firm—Marshall, O'Toole, Gerstein, Murray & Bicknell

[57] ABSTRACT

A lightweight burner block assembly includes (a) a relatively thick exterior shell, the exterior shell comprising a refractory material including fibrous alumina and silica and having an internal bore; and (b) a relatively thin, erosion resistant liner inserted into the internal bore, the liner comprising (i) a fabric matrix of woven ceramic fibers having insulating properties and thermal shock resistance properties and (ii) silicon carbide particles supported by and coating the fabric matrix.

14 Claims, 1 Drawing Sheet

BURNER BLOCK ASSEMBLY AND MATERIAL

FIELD OF THE INVENTION

The present invention is directed to a lightweight, corrosion resistant burner block assembly and to materials comprising the burner block assembly. In particular, the present invention is directed to a thermal shock resistant and corrosion resistant burner block assembly that is relatively lightweight and that demonstrates thermal insulating properties.

BACKGROUND OF THE INVENTION

A burner block is a device used to heat either a surface or an article. In general, a burner block is manufactured from refractory material and has a bore therethrough. Air and a combustible gas are introduced into one end of the bore, wherein they are mixed to form a fuel mixture, then ignited. The resulting flame that exits the opposite end of the bore is directed to the surface or article to be heated.

Burner blocks are used in a wide range of industrial applications. For example, burner blocks are used in metal plating operations to diffuse a metal coating into steel. In this process, a steel strip is passed through a molten metal coating bath, such as a bath of molten zinc alloy, to coat the steel strip with the molten metal. The coated strip of steel then is passed between several operating burner blocks which direct flames toward the steel strip. The flames heat the surfaces of the coated steel strip to about 2300° F., and thereby diffuse the metal coating into the steel surfaces.

Conventional burner blocks are constructed from a hard, castable refractory material, such as the material used in the making of refractory concrete, to provide a burner block having a density of about 150 lbs/ft$^3$ (pounds per cubic foot). Conventional burner blocks fail relatively rapidly because the blocks exhibit severe radial cracking, i.e. cracks that extend perpendicular to the direction of the bore. The radial cracking leads to inefficient burner operation and causes deterioration of the refractories, like insulating fire brick or ceramic fiber modules, surrounding the burner blocks. Burner block deterioration also causes hot spots to form on the furnace shell. As a result, conventional burner blocks must be replaced relatively frequently.

Thermal shock, caused by frequent heating and cooling of the burner blocks, is the major cause of burner block failure. Therefore, improved burner blocks were developed which were manufactured from an upgraded castable refractory, such as a block including an increased amount of alumina or reinforced with stainless steel needles, and that exhibited an improved resistance to thermal cracking. However, such improved burner blocks also eventually failed due to thermal shock within an unacceptably short time period.

Accordingly, there is a need for a burner block that effectively resists radial cracking due to thermal shock and, consequently, is not subject to continual replacement. As an alternative to the conventional castable refractory material, a burner block manufactured from a fiber material has been proposed. The fiber material has an improved thermal shock resistance because the fiber material is internally porous. The fiber material also has the advantage of a substantially reduced density compared to a conventional refractory material, thereby reducing the overall furnace mass and improving furnace response time. In addition, the fiber material exhibits superior insulating properties over conventional refractory material, thereby significantly reducing furnace shell temperatures.

However, a burner block manufactured from a fiber material also possesses substantial disadvantages compared to a burner block manufactured from conventional refractory material. For example, the fiber burner block is brittle, and therefore subject to breaking and crumbling if impacted, such as by a workman during routine maintenance.

An even greater disadvantage demonstrated by a fiber burner block is the relative inability of the fiber material to withstand the high convection environment found in the furnace. When operating, the furnace uses an air-gas fuel mixture that passes through the burner block at a high velocity, such as about 22 ft/sec (feet per second) or greater for a burner having a 3 inch exit port. Usually, the air and gas are mixed in the burner block, with combustion occurring within the block and completed as the fuel mixture exits the burner. The air-gas fuel mixture passing through the burner block at a high velocity creates a turbulence that erodes the fiber furnace block. Erosion occurs even in the absence of particulate matter in the air-gas fuel mixture, but the rate of erosion is greatly increased if particulate matter is present in the air-gas fuel mixture. For example, if particulate matter is present in the air-gas fuel mixture, the fiber burner block is eroded even when the fuel mixture passes through the burner block at a relatively low velocity of about 5 ft/sec.

Accordingly, it would be desirable to provide a burner block that possesses the advantageous properties both of (1) a fiber material burner block, e.g. relatively lightweight, thermal shock resistance and high insulation, and of (2) a refractory material burner block, e.g. structural integrity and erosion resistance. The present invention is directed to providing such a new and improved burner block.

SUMMARY OF THE INVENTION

The present invention is directed to a multi-layer article that exhibits both thermal shock resistance and erosion resistance, and has thermal insulating properties. In particular, the multi-layer article comprises: (a) a relatively thick exterior layer comprising a refractory material that is relatively light weight, internally porous, thermal shock resistant and relatively erosive; and (b) a relatively thin interior layer lining the exterior layer. The relatively thin interior layer is erosion resistant, corrosion resistant and thermal shock resistant, and comprises (i) a fabric matrix of woven ceramic fibers having insulating and thermal shock resistant properties, and (ii) silicon carbide particles supported by and coating the fabric matrix.

More particularly, the present invention is directed to a burner block assembly comprising a relatively thick exterior shell having an internal bore and a relatively thin liner for the internal bore. The exterior shell comprises a refractory material that is lightweight, internally porous, and thermal resistant. Generally, the refractory material included in the exterior shell is a relatively erosive material, such as comminuted fibrous alumina and silica, that is adversely affected by the high velocity air-gas fuel mixture passing through the burner block.

The relatively thin liner for the internal bore of the exterior shell of the burner block assembly comprises a fabric matrix and silicon carbide particles. Generally, the fabric matrix includes woven ceramic fibers, such as ceramic fibers comprising alumina and silica as predominant components and boria as a minor component. The fabric matrix supports, and is coated by, the silicon carbide particles. The silicon carbide particles impart erosion resistance to the relatively thin liner, and accordingly, to the burner block assembly as a whole.

A burner block assembly of the present invention demonstrates the following advantages: substantially reduced radial cracking compared to conventional burner blocks constructed from castable refractory material; a relatively light weight to improve furnace response time and reduce overall furnace mass; superior insulating properties compared to conventional castable refractory materials; rapid replacement of broken or damaged burner blocks; and reusable liners for the internal bore of the exterior shell of the burner block assembly.

In accordance with another important aspect of the present invention, the relatively thin liner of the burner block assembly can be reused if the exterior shell of the burner block assembly is damaged or otherwise needs to be replaced. The liner for the internal bore simply is removed from a damaged exterior shell and inserted into a replacement exterior shell. In one embodiment, the internal bore of the exterior shell and the liner have a tapered circular cross-section, and therefore have the shape of a truncated cone. In this embodiment, the air-gas fuel mixture enters the burner block at the end of the lined internal bore having the largest diameter, and the flame and gas exit the end of the lined internal bore having the smallest diameter. Accordingly, the pressure of the air-gas fuel mixture passing through the internal bore secures the tapered liner within the tapered internal bore. When an air-gas fuel mixture is not passing through the bore, the liner simply can be removed from the burner assembly, then inserted, quickly and without difficult manipulative steps, into another exterior shell.

Another important aspect of the present invention is to provide a method of manufacturing a burner block assembly of the present invention wherein the exterior shell of fibrous refractory material is vacuum formed, and wherein the silicon carbide particles are vacuum formed on the fiber matrix of the liner.

BRIEF DESCRIPTION OF THE FIGURES

The above and other aspects and advantages of the present invention will become apparent from the following detailed description of the present invention taken in conjunction with the drawings, wherein.

DETAILED DESCRIPTION OF THE PREFERRED EMBODIMENTS

Figure 1:
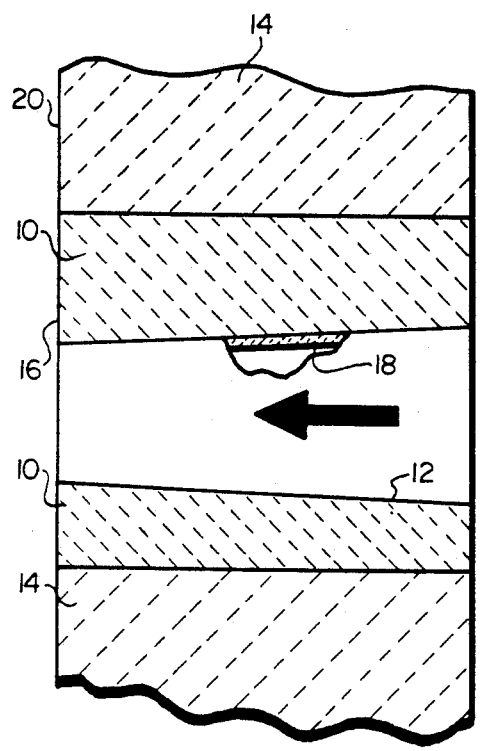
FIG. 1 is a fragmentary side elevational view of one embodiment of a burner block assembly of the present invention.
Figure 2:
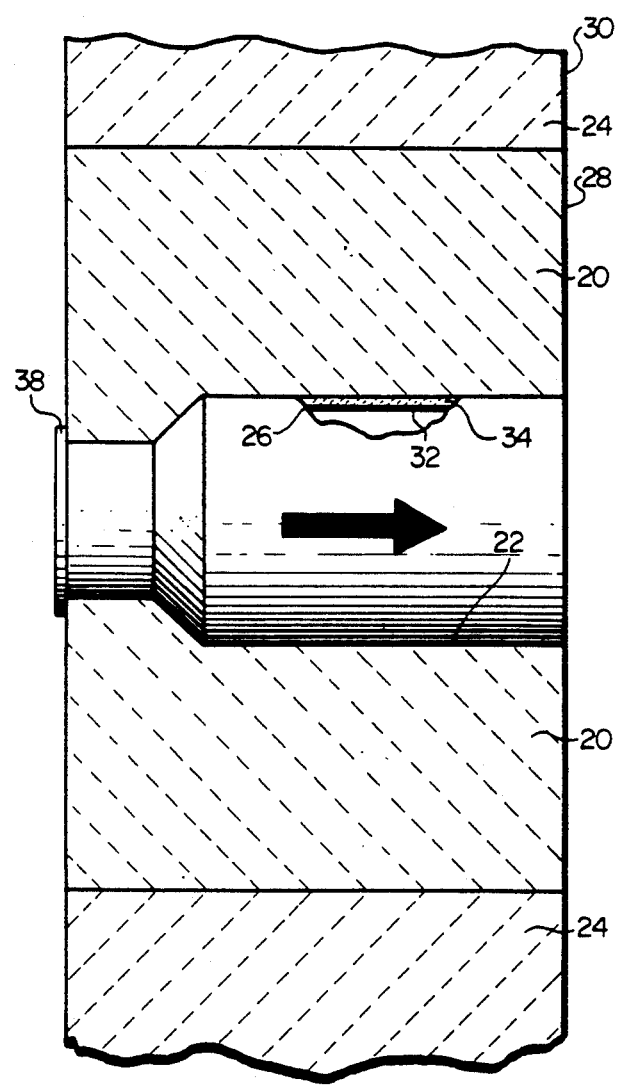
FIG. 2 is a fragmentary side elevational view of another embodiment of the burner block assembly of the present invention.
Figure 3:
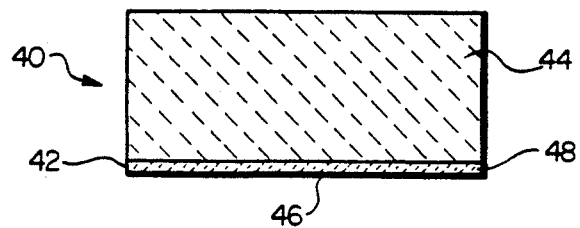
FIG. 3 in an enlarged partial side view of an article of the present invention.

FIGS. 1-3 show multi-layer articles comprising a relatively thick, relatively lightweight, internally porous and thermal shock resistant exterior layer, and a relatively thin, corrosion resistant, erosion resistant and thermal shock resistant interior layer lining the exterior layer. FIGS. 1-2 illustrate the article in the form of a burner block assembly. In particular, FIG. 1 is a fragmentary side elevational view of a burner block assembly comprising a relatively thick exterior shell 10 having an internal bore 12 therethrough, and a relatively thin interior liner 18 inserted into the internal bore 12. The burner block assembly is positioned in a furnace wall 14 such that a surface 16 of the burner block assembly is flush with a surface 20 of the furnace wall 14. The furnace wall 14 is manufactured from conventional refractory material, such as insulating firebrick or a ceramic fiber.

The exterior shell 10 is manufactured from a relatively lightweight material in comparison to the conventional refractory material comprising the furnace wall 14. This relatively lightweight material also is internally porous and thermal shock resistant. It has been found that a relatively lightweight exterior shell 10 is resistant to thermal shock because of the porosity of the material comprising the exterior shell 10. The interior liner 18 for the internal bore 12 comprises a fabric matrix that has insulating and thermal shock resistance properties, and silicon carbide particles coated on and supporting the fabric matrix.

The exterior shell 10, comprising a lightweight and porous material, would be subject to erosion by the high velocity air-gas fuel mixture passing through the internal bore 12. The interior liner 18 effectively resists the erosive properties of the high velocity air-gas fuel mixture. Accordingly, the present invention overcomes a disadvantage found in a burner block manufactured from standard refractory materials, such as dense castables, that are subject to radial cracking due to thermal shock. These conventional burner blocks required constant replacement due to radial cracking, and replacing such a failed burner block required substantial time and effort because conventional burner blocks were constructed from relatively heavy materials.

Although a burner block assembly of the present invention resists erosion, the lightweight and porous material comprising the exterior shell 10 is brittle and subject to breakage if impacted with sufficient force. However, the relatively lightweight character of the external shell 10 makes replacement easy in case of accidental breakage. For example, an exterior shell 10 of the present burner block assembly has a density of about 10 to about 20 lb/ft$^3$. In contrast, a conventional burner block manufactured from a castable refractory material has a density of about 150 lb/ft$^3$. Furthermore, the interior liner 18 can be removed from a damaged exterior shell 10 and inserted into a replacement exterior shell 10, thereby providing an added cost savings.

In general, a burner block assembly comprising an exterior shell 10 and an interior liner 18 is manufactured by forming the interior liner 18 around a mandrel, said mandrel having the shape desired for the interior liner 18. As will be discussed more fully hereinafter, the exterior shell 10 is formed by a vacuum process in a chamber including a mandrel having the shape desired for the internal bore 12. It is envisioned that the exterior shell 10 can be formed directly over the interior liner 18 to provide a burner assembly of the present invention, or the exterior shell 10 and the interior liner 18 can be formed independently, then the interior liner 18 can be inserted into the exterior shell 10 to provide a burner assembly of the present invention.

In particular, the interior liner 18 is manufactured by providing a mandrel that essentially matches the desired shape and dimensions of the interior liner 18. Preferably, the mandrel, and therefore the interior liner 18, has a tapered, circular cross-section such that the interior liner 18 has the shape of a truncated cone. Such a tapered configuration is preferred because by positioning the end of the interior liner 18 having the smaller diameter flush with interior surface 20 of the furnace wall 14, as shown in FIG. 1, the interior liner 18 cannot be forced out of the burner block by the high velocity air-gas fuel mixture.

For example, in FIG. 1, the high velocity air-gas fuel mixture passes through the burner block assembly in the direction of the arrow. The pressure of the high velocity fuel mixture forces the interior liner 18 against the exterior shell 10, and the tapered configuration of the internal bore 12 and interior liner 18 keeps the interior liner 18 from being forced from the internal bore 12. The tapered configuration therefore provides the additional advantage of allowing the interior liner 18 to be inserted into the exterior shell 10 without the need for a securing or fastening means. Therefore, if the exterior shell 10 is damaged and must be replaced, the interior liner 18 is easily removed from the damaged exterior shell 10 and reinserted into a replacement exterior shell 10.

The interior liner 18 can have essentially any desired shape or dimensions. In one embodiment, a tapered interior liner 18 of circular cross section has a length of about 9 inches, and circular cross-section tapering from a diameter of about 3.5 inches to about 3 inches.

The interior liner 18 is formed by wrapping a fabric matrix around a mandrel having a shape and dimensions essentially identical to the interior liner 18. Prior to wrapping the fabric matrix around the mandrel, the fabric matrix is dipped into, or coated with, a slow curing hardening agent. The coated fabric matrix then is wrapped around the mandrel, and the hardening agent is allowed to cure, or set. The fabric matrix therefore hardens into the shape and dimensions of the mandrel, and is removed from the mandrel. The interior liner 18 comprises a single layer of the fabric matrix, or, alternatively, comprises of plurality of stacked sublayers of the fabric matrix.

A useful fabric matrix possesses insulating and thermal shock resistance properties, and usually comprises woven ceramic fibers. A particularly useful ceramic fiber fabric matrix comprises alumina and silica. To achieve the full advantage of the present invention, the fabric matrix comprises ceramic fibers including alumina and silica as the major components, and further comprises a minor amount of boria. A nonlimiting example of a useful fabric matrix is sold commercially under the tradename NEXTEL TM 440 available from 3M, St. Paul, MN. NEXTEL TM 440 is manufactured from fibers including mullite and 2% by weight boria. Mullite includes about 70% by weight alumina and about 30% by weight silica.

After the hardened fabric matrix is removed from the mandrel, the fabric matrix is coated with an aqueous suspension of silicon carbide particles. The water present in the suspension is removed by subjecting the coated fabric matrix to a vacuum. The silicon carbide particles therefore are distributed throughout the fabric matrix, and form a coating on the fabric matrix to support the fabric matrix and assist the fabric matrix maintain its predetermined shape. In addition, the coating of silicon carbide particles (a) is resistant to the erosive effects of the high velocity air-gas fuel mixture, thereby imparting erosion resistance to the fabric matrix of the interior liner 18, and, in turn, to the exterior shell 10; (b) is corrosion resistant; and (c) is thermal shock resistant.

It has been found that the interior liner 18 effectively resists the erosive effects of a high velocity air-gas fuel mixture, such as a fuel mixture having a velocity of about 22 ft/sec. The interior liner 18 effectively resists erosion caused by a high velocity gas that is free of particulate matter, or by a high velocity gas that includes particulate matter.

The exterior shell 10 can be formed on the interior liner 18, or, preferably, the exterior shell 10 can be formed independent of the interior liner 18. The exterior shell 10 is manufactured from a relatively lightweight material having a density of about 10 to about 20 lbs/ft$^3$, and preferably of about 12 to about 15 lbs/ft$^3$. A conventional burner block is manufactured from hard, castable refractory block having a density of about 150 lb/ft$^3$. Such heavy, conventional burner blocks demonstrated thermal shock problems and were difficult to replace. In contrast, an exterior shell 10 of the present burner block assembly is porous, therefore significantly reducing thermal shock problems; and is lightweight, therefore simplifying replacement. As an added advantage, the reduced mass of the exterior shell 10 reduces overall furnace mass to improve furnace response time; and the superior insulating properties of the exterior shell 10 significantly reduces furnace shell temperatures compared to conventional burner blocks.

The exterior shell 10 of the present burner block assembly is manufactured from comminuted ceramic fibers comprising alumina and silica. The ceramic fibers include from about 50% to about 90%, and preferably from about 60% to about 80%, alumina, as $Al_2O_3$; and from about 10% to about 50%, and preferably from about 20% to about 40% silica, as $SiO_2$. The temperature resistance of the exterior shell 10 increases as the alumina content in the exterior shell 10 increases.

The exterior shell 10 preferably is manufactured in a vacuum forming process. In the vacuum forming process, the alumina and silica ceramic fibers first are comminuted and reduced to a sufficiently small particle size, such as needles having a length in the range of $\frac{1}{2}$ inch to about 2 inches, by methods well-known in the art. The ceramic fiber particles then are added to water, and are suspended in the water by a suspending agent, such as, for example, a nonionic surfactant, like an ethoxylated nonylphenol or an ethoxylated octylphenol.

The resulting aqueous suspension of ceramic fibers then is introduced into a vacuum chamber containing a mandrel. The vacuum chamber has a shape and dimensions essentially equal to the desired shape and external dimensions of the exterior shell 10, such as, for example, a rhombohedron having the dimensions of about 9 inches by about 6 inches by about 6 inches. An exterior shell 10 of such dimensions is suitable for an interior liner 18 having the shape of a truncated cone having a circular cross-section diameter ranging from about 3 inches to about 3.5 inches. It should be understood that the dimensions and the shape of the exterior shell 10 are not necessarily limited, but are determined by the desired, or necessary, size of the burner block assembly, by the insulating properties of the material comprising the exterior shell 10, and by practical considerations, such as ease of replacing a damaged burner block assembly.

The vacuum chamber also includes a mandrel having essentially the same shape and dimensions as the interior liner 18. Accordingly, by forming the exterior shell 10 around the mandrel, the internal bore 12 is formed. The interior liner 18 can be inserted into the internal bore 12 of the exterior shell 10. In an alternate method, the exterior shell 10 can be formed around a mandrel that has the interior liner 18 inserted thereover. In this case, the interior liner 18 already is positioned within the exterior block 10.

In forming the exterior shell 10, a portion of the aqueous ceramic fiber suspension is introduced into the vacuum chamber containing the mandrel. The vacuum chamber is subjected to a vacuum, such as from about 25 to about 35 in. Hg (inches mercury), and water is removed from the vacuum chamber through perforations in the walls of the vacuum chamber. The ceramic fibers remain in the vacuum chamber, and the dried ceramic fibers form around the mandrel to provide the desired shape of the internal bore 12 of the exterior shell 10. An additional amount of the ceramic fiber suspension is introduced into the vacuum chamber, and the vacuum process is repeated until the interior of the vacuum chamber contains the desired volume of dried ceramic fibers. The resulting exterior shell 10, comprising comminuted fibrous alumina and silica, then is removed from the vacuum chamber. The exterior shell 10 has an internal bore 12 into which the interior liner 18 can be inserted, and the resulting burner block assembly can be used in numerous metallurgical applications requiring heat insulation, resistance to thermal shock, resistance to corrosion and resistance to erosion.

FIG. 2 illustrates another embodiment of the burner block assembly of the present invention. The burner block assembly comprises an exterior shell 20 and an interior liner 26, wherein the shape and dimensions of the interior liner 26 cooperate with an internal bore 22 of the exterior shell 20. The exterior shell 20 is relatively lightweight and porous, and has an internal bore 22 therethrough, as described above in relation to the exterior shell 10 and internal bore 12 of FIG. 1. The interior liner 26 comprises a coating 32 of silicon carbide particles and a layer 34 comprising a fabric matrix having silicon carbide particles distributed throughout, as described above in relation to the interior layer 18 of FIGS. 1 and 3.

In this embodiment, the air-gas fuel mixture enters the internal bore 22 of the exterior shell 20 from an end of the internal bore 26 having a smaller diameter than the exit port of the internal bore 26. The direction of the air-gas fuel mixture flow is indicated by the arrow in FIG. 2. The burner block assembly illustrated in FIG. 2 is positioned in a furnace wall 24 such that a surface 28 of the burner block assembly is flush with a surface 30 of the furnace wall 24.

The embodiment illustrated in FIG. 2 includes an internal bore 22 having a dimension and shape such that the bore 22 has a larger diameter at the exit port of the bore, wherein the air-gas fuel mixture and the flame exit the bore 22, than the bore end wherein the air-gas fuel mixture enters the internal bore 22. In this embodiment, the interior liner 26 can be adhesively secured within the bore 22 of the exterior shell 20, such that the velocity of the incoming fuel mixture does not force the interior liner 26 from the bore 22. However, by adhesively securing the interior liner 26 within the bore 22, the interior liner 26 has essentially no freedom of movement and cracks can develop in the silicon carbide layer 32 of the interior liner 26. Although the cracks in the layer 32 do not adversely affect the performance of the interior liner 26, the cracks can be avoided by securing the internal liner 26 in the bore 22 by a collar 38, or alternatively by a bayonet-type key and slot arrangement. The collar 38 not only secures the interior liner 26 in the bore 22, but also allows the interior liner 26 a sufficient freedom of movement, thereby eliminating the formation of cracks in the layer 32.

A configuration illustrated in FIG. 2 is preferred in relatively large furnaces requiring larger burner block assemblies, such as a burner block assembly that has a length of at least about 10 inches, and a bore diameter of greater than about 5 inches at the exit port of the bore 22, where the fuel mixture and flame exits the bore 22. In a particular embodiment of the burner block assembly illustrated in FIG. 2, the exterior shell 20 had dimensions of about 18 inches by about 18 inches by about 14 inches, and the bore 22 had a diameter of about 3.5 inches for the entering fuel mixture and a diameter of about 7 inches for the exiting fuel mixture and flame.

FIG. 3 is an illustration of a multi-layered article 40 having an interior layer 42 that is relatively thin compared to a relatively thick exterior layer 44. Such a multi-layered article can be used in any application requiring a relatively lightweight article that possesses the properties of erosion resistance, corrosion resistance, thermal shock resistance and insulation.

In general, the interior layer 42 has a thickness of about 1/32 inch to about ¼ inch, and preferably of about 1/24 inch to about ⅛ inch. For comparison, the exterior layer 44 has a thickness of about ½ to about 3 inches, and preferably of about 1 inch to about 2 inches. As further illustrated in FIG. 3, the interior layer 42 includes a coating 46 of silicon carbide particles on the interior surface of the interior layer 42, i.e. the face of interior layer 42 that is exposed to an erosive medium, e.g. a high velocity air-gas fuel mixture. Coating 46 generally has a thickness ranging from about 30% to about 70% of the total thickness of the interior layer 46. The interior layer 42 also includes a layer 48 comprising the fabric matrix and silicon carbide particles distributed throughout the fabric matrix, said layer 48 having a thickness ranging from about 30% to about 70% of the total thickness of the interior layer 46. Layer 48 is in contact with the exterior layer 44 of the article 40. It also should be noted that the layer 48 can comprise a plurality of stacked sublayers of the fabric matrix, with silicon carbide particles distributed throughout the sublayers of the fabric matrix.

FIG. 3 depicts, in block form, an article which, in accordance with the present invention, can also be used, in the annular forms shown in Figs. 1-2, to provide a burner block assembly.

An improved burner block assembly of the present invention overcomes several problems associated with a conventional burner block. Accordingly, the need to replace burner blocks on a consistent basis has been reduced substantially. In addition, if necessary, the improved burner block assemblies are easy and economical to replace because the exterior shell is lightweight and the interior liner easily can be reinserted into an undamaged exterior shell. In comparison to a conventional burner block comprising a castable refractory material, the present burner block assemblies also demonstrate improved thermal shock resistance, improved insulating properties and a reduced furnace response time. Such improvements and advantages have not been achieved by conventional burner blocks.

Obviously, many modifications and variations of the invention as hereinbefore set forth can be made without departing from the spirit and scope thereof and therefore only such limitations should be imposed as are indicated by the appended claims.

I claim:

1. A multi-layer article having thermal insulating properties, thermal shock resistance properties and erosion resistance properties, said multi-layer article comprising:
   a relatively thick exterior layer composed of relatively lightweight, internally porous, thermal shock resistant, relatively erosive, refractory material comprising comminuted fibrous alumina and silica;
   and a relatively thin, erosion resistant, corrosion resistant and thermal shock resistant interior layer lining said exterior layer and comprising (a) a fabric matrix of woven ceramic fibers having insulating and thermal shock resistant properties and (b) silicon carbide particles supported by and coating said matrix.

2. A multi-layer article as recited in claim 1 wherein:
   said exterior layer is vacuum formed.

3. A multi-layer article as recited in claims 1 or 2 wherein:
   said silicon carbide particles in said interior layer are vacuum formed on said matrix.

4. A multi-layer article as recited in claim 1 wherein;
   said matrix is composed of woven fibers comprising alumina and silica as the predominant components and a minor amount of boria.

5. A multi-layer article as recited in claim 4 wherein:
   said fabric layer comprises a plurality of stacked sub-layers of said fabric, and said silicon carbide particles are distributed throughout said sub-layers.

6. A multi-layer article as recited in claim 4 wherein:
   said fibers comprise mullite and a minor amount of boria.

7. A multi-layer article as recited in claim 4 wherein:
   said fibers contain about 0.5 to about 5 wt.% boria.

8. A burner block assembly comprising:
   a relatively thick, exterior shell having an internal bore;
   and a relatively thin, erosion resistant, corrosion resistant and thermal shock resistant liner for said internal bore;
   said exterior shell being composed of a relatively light weight, internally porous, thermal shock resistant, relatively erosive, refractory material comprising comminuted fibrous alumina and silica;
   said liner comprising (a) a fabric matrix of woven ceramic fibers having insulating and thermal shock resistant properties and (b) silicon carbide particles supported by and coating said matrix.

9. A burner block assembly as recited in claim 8 wherein:
   said exterior shell is vacuum formed.

10. A burner block assembly as recited in claim 8 wherein:
    said silicon carbide particles in said liner are vacuum formed on said matrix.

11. A burner block assembly as recited in claim 8 wherein:
    said matrix is composed of woven fibers comprising alumina and silica as the predominant components and a minor amount of boria.

12. A burner block assembly as recited in claim 8 wherein:
    said fabric layer comprises a plurality of stacked sub-layers of said fabric and said silicon carbide particles are distributed throughout said sub-layers.

13. A burner block assembly as recited in claim 8 wherein:
    said fibers comprise mullite and a minor amount of boria.

14. A burner block assembly as recited in claim 8 wherein:
    said fibers contain about 0.5 to about 5 wt.% boria.

* * * * *